S. W. HILL.
FRUIT TREE PROTECTOR.

No. 177,245. Patented May 9, 1876.

WITNESSES
Robert Everitt
C. H. Searle

INVENTOR,
Simeon W. Hill.
Gilmore, Smith & Co.
ATTORNEYS.

UNITED STATES PATENT OFFICE.

SIMEON W. HILL, OF POPE, MISSISSIPPI.

IMPROVEMENT IN FRUIT-TREE PROTECTORS.

Specification forming part of Letters Patent No. 177,245, dated May 9, 1876; application filed April 1, 1876.

*To all whom it may concern:*

Be it known that I, SIMEON W. HILL, of Pope, in the county of Panola and State of Mississippi, have invented a new and valuable Improvement in Fruit-Tree Protectors; and I do hereby declare that the following is a full, clear, and exact description of the construction and operation of the same, reference being had to the annexed drawings, making a part of this specification, and to the letters and figures of reference marked thereon.

Figure 1:
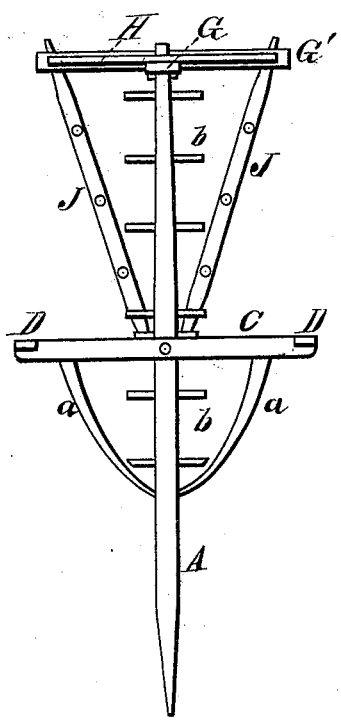
Figure 2:
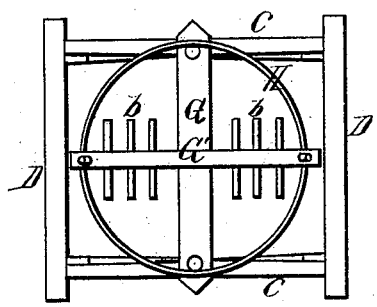

Figure 1 of the drawings is a representation of a front elevation of my fruit-tree protector, and Fig. 2 is a plan view of the same.

The nature of my invention consists in the construction and arrangement of a fruit-tree protector, as will be hereinafter more fully set forth.

In the annexed drawing, A represents base-posts set firmly in the ground, one on each side of the fruit-tree, and extending up through the tree. At a suitable height these posts are connected by a cross-beam, and they are also provided with arms C C, the outer ends of which are connected by bars D D. The arms C C are supported by braces $a$ $a$, as shown, the whole forming a substantial platform, that will enable any one to stand upon and gather fruit from the tree without any damage or weight upon the tree. The upper ends of the posts A are connected by a cross-bar, G, and in the center, across the same, is another bar, G', at right angles therewith, the outer ends of said bar G' being supported from the lower cross-bar by means of the inclined arms J J. The bars G G' support a circle, H, as shown, at the top of the structure, so as to encircle the top of the tree, and the structure forms a support and protection from the wind, &c. Should the tree grow very tall there are steps, $b$ $b$, fastened in the posts A, and arms J, for a person to climb to the very top of the tree with perfect ease and security. The lower platform C D also protects the tree from the wind, and from cattle or other stock.

What I claim as new, and desire to secure by Letters Patent, is—

1. The posts A, connected by a cross-bar, and provided with the arms C C, connected by the bars D D, as and for the purpose set forth.

2. The combination of the posts A, platform C D, top frame G G', and arms J J, substantially as and for the purpose herein set forth.

In testimony that I claim the above I have hereunto subscribed my name in the presence of two witnesses.

SIMEON WATSON HILL.

Witnesses:
J. M. LACKEY,
A. M. BRIGHT.